(12) United States Patent  (10) Patent No.: US 7,818,035 B2
Bury                      (45) Date of Patent:     Oct. 19, 2010

(54) SATELLITE PHONE HOLDER

(75) Inventor: Henryk Bury, Mielec (PL)

(73) Assignee: BURY Sp. z o.o., Mielec (PL)

( * ) Notice: Subject to any disclaimer, the term of this patent is extended or adjusted under 35 U.S.C. 154(b) by 22 days.

(21) Appl. No.: 12/471,466

(22) Filed: May 25, 2009

(65) Prior Publication Data
US 2009/0270143 A1    Oct. 29, 2009

Related U.S. Application Data

(63) Continuation of application No. PCT/PL2006/000088, filed on Dec. 8, 2006.

(51) Int. Cl.
H04B 1/38 (2006.01)

(52) U.S. Cl. .............. 455/575.1; 455/569.1; 455/569.2; 455/556.1; 455/575.9

(58) Field of Classification Search .............. 455/569.1, 455/569.2, 90.3, 556.1, 575.1, 575.8, 575.9, 455/95, 98, 99
See application file for complete search history.

(56) References Cited

U.S. PATENT DOCUMENTS

2002/0032041 A1* 3/2002 Hirai et al. .................. 455/557
2005/0118864 A1   6/2005 Watanabe
2006/0183511 A1*  8/2006 Shen ........................ 455/575.1
2007/0099681 A1*  5/2007 Kielland ................... 455/575.1

FOREIGN PATENT DOCUMENTS

DE    196 52 826 A1    6/1998
DE    199 46 746 A1    4/2001
WO    03/066381 A2     8/2003

* cited by examiner

Primary Examiner—Tuan A Pham
(74) Attorney, Agent, or Firm—Matthias Scholl P.C.; Matthias Scholl

(57) ABSTRACT

A satellite phone holder, particularly for mechanical vehicles, attachable to other electronic devices, particularly to a hands-free mobile phone kit. The holder comprises a locking module (2), composed of a disc (9) with a lever (10); this disc is located, by means of a ring (7), in a rotatable socket (3) in the base (1) and is provided with a rotatable plug (8), into which an antenna core (11) is inserted. On the bottom surface of the disc (9) there is an insert (14), which, when the locking module (2) is in "blocked" position, reflects the light from a photodiode (20) to a detector (21), which activates an electronic module (4) of the holder and switches between the mobile phone's operating modes.

7 Claims, 8 Drawing Sheets

SATELLITE PHONE HOLDER

CROSS-REFERENCE TO RELATED APPLICATIONS

This application is a continuation of International Patent Application No. PCT/PL2006/000088, with an international filing date of Dec. 8, 2006, designating the United States, now pending, the contents of which are incorporated herein by reference in its entirety.

BACKGROUND OF THE INVENTION

1. Field of the Invention

This invention relates to a satellite phone holder, particularly for mechanical vehicles, attachable to other electronic devices, particularly to a hands-free mobile phone kit.

2. Description of the Related Art

A major inconvenience of satellite phones is their relatively high weight, which makes it difficult for the user to carry the phone, and a limited range of the antenna, which results in the necessity to adjust the position of the antenna to get an optimum connection with the satellite. To avoid this inconvenience supports are used as a base, onto which the satellite phone is placed. These bases are usually provided with a high-range stationary antenna mounted, for example, on roofs, with a power supply module and an additional lightweight portable phone set that can be used instead of a heavy satellite phone, which stays resting in the base. The base has also an electric connector, which is used to connect the electric system of the satellite phone to that of the base. Moreover, the base has plugs, which, while mounting, are inserted into the jack of the satellite phone to obtain a connection to the antenna.

The British Patent GB 2 343 552 describes a mechanism to mount and set a mobile phone antenna. The mechanism includes a plate with a clamp for mounting the phone; a system, which provides the optimum setting for the antenna connected to the plate; a supporting plate, which holds the antenna in one out of two "unwound" positions or in the "wound" position; a snap fastener, which is pressed by a spring, activated with a button and used to mount and dismount the antenna; and a cover. Pressing the button and aligning the catches on the antenna with the catches in the mechanism enables placing and mounting the antenna in the mechanism or removing it from the mechanism. The spring, which presses the plate, enables rotating the antenna and holding it in three different positions thanks to a protrusion in the spring and the catches on the plate.

The U.S. Pat. No. 5,218,369 describes a detachable connection mechanism for a mobile phone antenna provided with a connector or an adapter, which is inserted into the casing and provided with a tip for the internal RF connection at one end and with an outer shielding of the antenna at the other end. The connector, once inserted into the mobile phone casing, is protected from rotation with a groove in the mobile phone casing and a protrusion on the connector edge. It is also protected from slipping out by means of a springing ball latch. The outer shielding of the antenna is protected from slipping out from the connector by a pin passing crosswise through the antenna rod inserted into the connector. It is possible to rotate the outer shielding of the antenna only by pulling it slightly to overcome the force of the string located in the connector. After rotating the outer antenna shielding, it is possible to lock it in a number of positions.

The U.S. Pat. No. 5,271,684 describes a connection mechanism for a mobile phone antenna, which enables a 90°-rotation of the antenna between its "operate" and "stand-by" positions. This mechanism includes a square mounting tube with a round shielding inserted into the tube and the antenna embedded radially in the shielding. The round hole in the mounting tube has oval cavities, engaging with a tooth in the antenna shielding to prevent its rotation beyond the "operating" or "stand-by" positions. A part of the round antenna shielding has a shorter diameter. This part is inserted into the hole in the mounting tube. Around this part of the shielding, there is an elastic ring plate, an edge of which is bent sinusoidally. This ensures tight contact between the outer shielding of the antenna and the mounting tube, blocks it in a proper position, and prevents the antenna shielding from slipping out from the mounting tube.

SUMMARY OF THE INVENTION

One objective of this invention is to provide a holder, which enables mounting a heavy satellite phone, particularly within a mechanical vehicle, and provides a concurrent connection to an additional electronic device, particularly, a hands-free mobile phone kit, and to an external antenna on the vehicle to improve the signal quality.

This objective is achieved in the present invention by providing a satellite phone holder, particularly for mechanical vehicles, attachable to other electronic devices, particularly to a hands-free mobile phone kit—which is characterized in that it includes a locking module, composed of a disc with a lever; this disc is located, by means of a ring, in a rotatable socket in the base and is provided with a rotatable plug, into which an antenna core is inserted. On the bottom surface of the disc there is an insert, which, when the locking module is in "blocked" position, reflects the light from a photodiode to a detector that switches between the mobile phone's operating modes.

The electronic module of the holder, according to this invention, is advantageously equipped with a PCB, which is fixed to the base and, by means of a connecting strip, is connected to a PCB provided with an electric coupling, which engages with an electric connector of the satellite phone.

The PCB in the electronic module has an advantageous electric connection to the switch activated by the buttons in order to change between the phone's operating modes as set by the locking module.

The plug in the holder has an advantageous form of a metal tube, inside which there is a slidable metal antenna core pressed by a push spring.

The base of the holder has a cover, composed of the upper part and the lower part with grip arms. The lower part is fixed to the base with a hinge and tilted to its initial position by the push springs.

The upper part of the cover, according to this invention, has a hole, which the plug with the antenna core passes through.

The tests of the satellite phone holder, which is, according to this invention, attachable to other electronic devices, particularly to a hands-free mobile phone kit, proved that it makes it easy to single-handedly mount a heavy satellite phone within a vehicle and activate electronic devices connected to it.

BRIEF DESCRIPTION OF THE DRAWINGS

The satellite phone holder, particularly for mechanical vehicles, attachable to other electronic devices, particularly to a hands-free mobile phone kit, according to the invention, is presented, by way of the example only, in the drawings, in which.

DETAILED DESCRIPTION OF THE EMBODIMENTS

Figure 1:
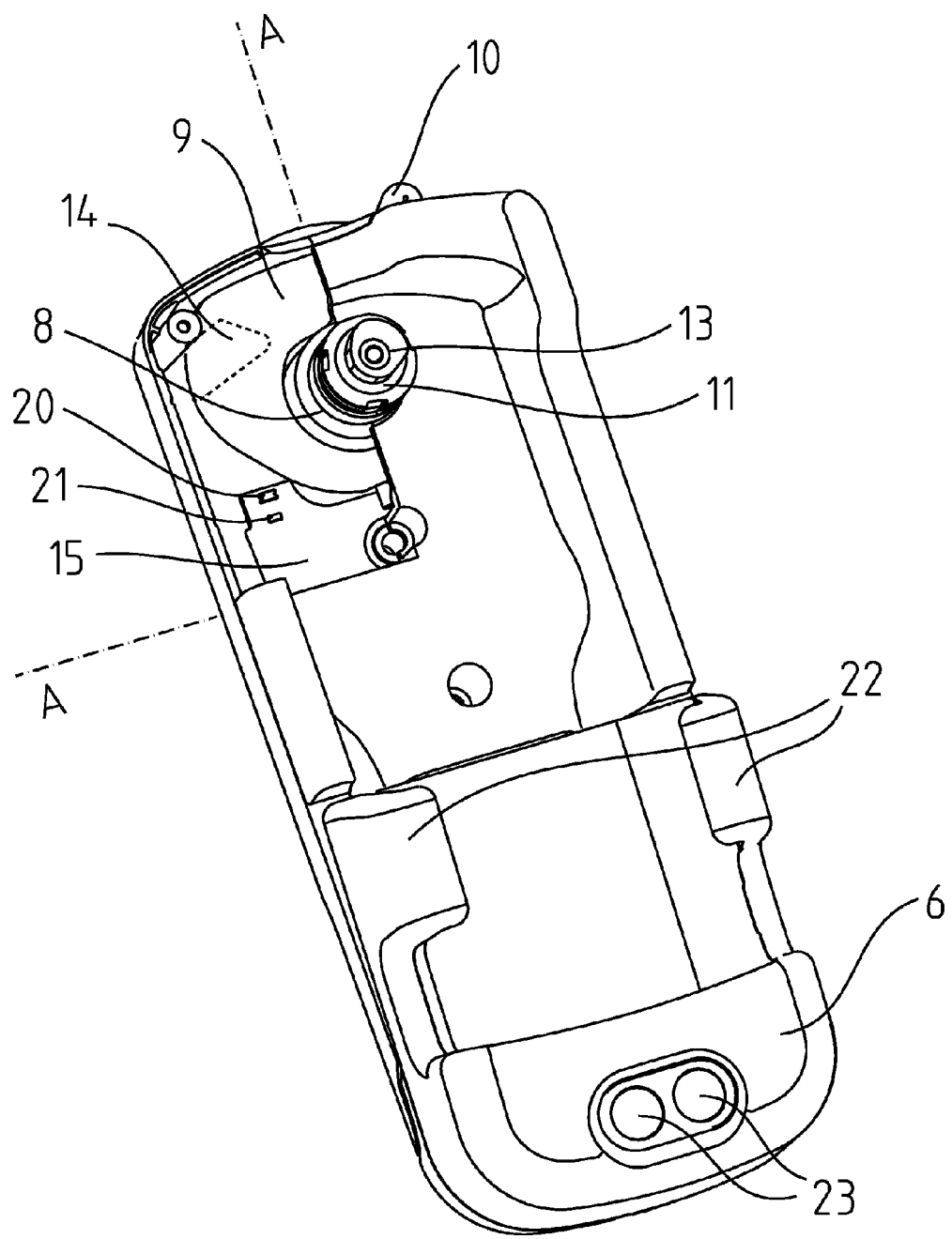
FIG. 1 depicts a perspective top view of the satellite phone holder, according to a representative embodiment of the invention, with the A-A section of the upper part of the cover shown in the initial position.
Figure 2:
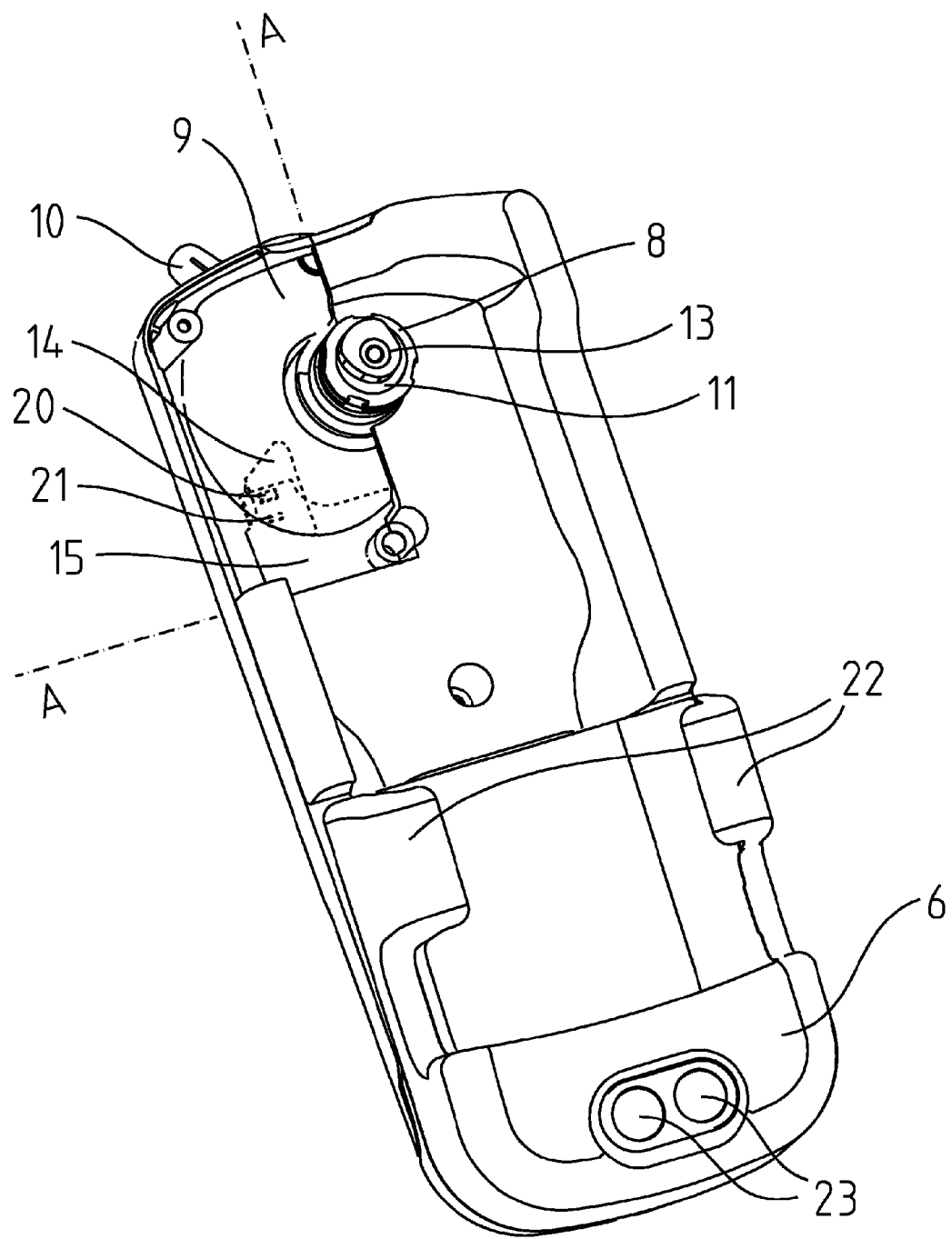
FIG. 2 depicts the satellite phone holder in a view as in the FIG. 1, but in the "blocked" position and concurrently connected to a hands-free mobile phone kit according to a representative embodiment of the invention.
Figure 3:
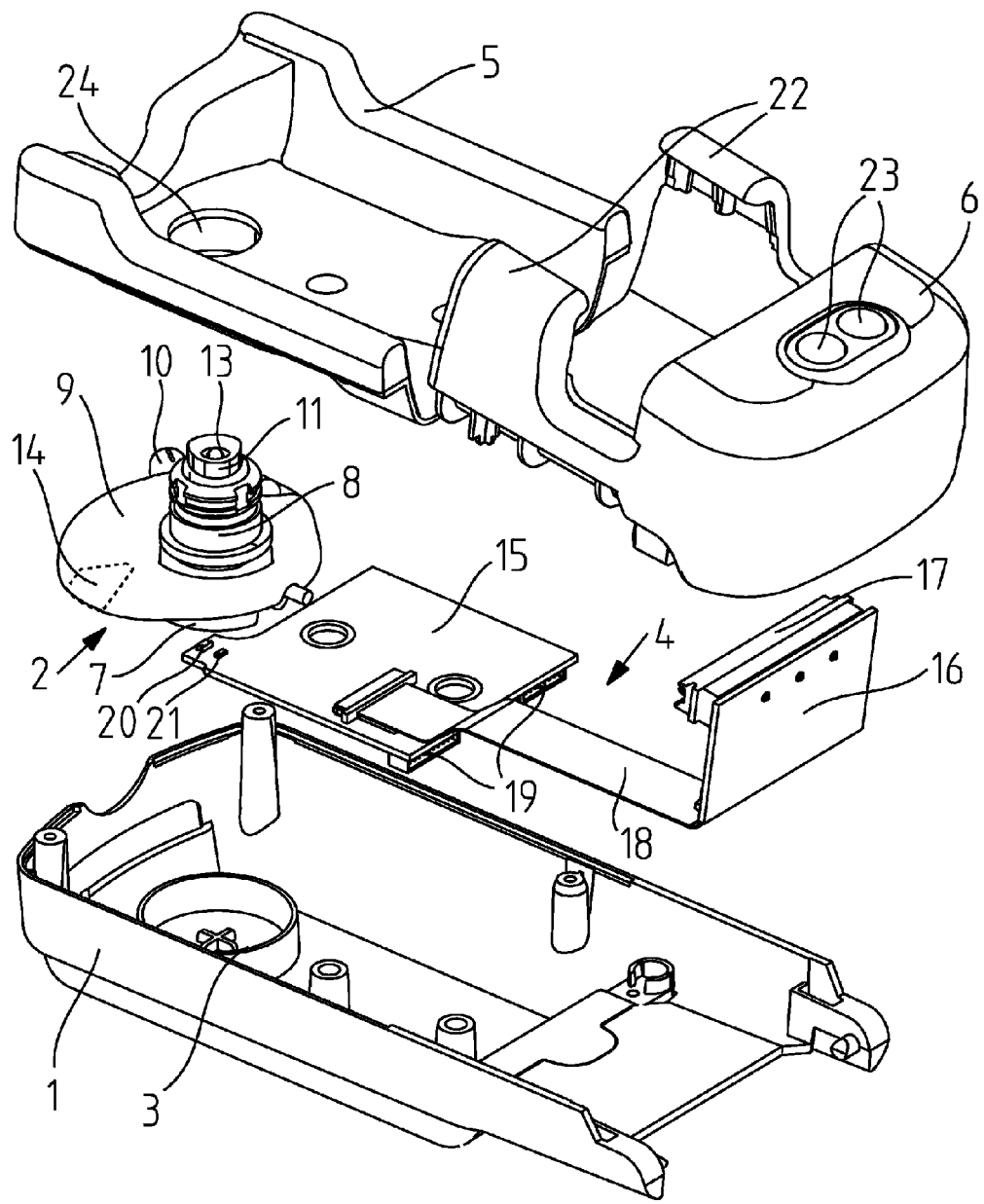
FIG. 3 provides an exploded view of the holder shown in FIG. 1.
Figure 4:
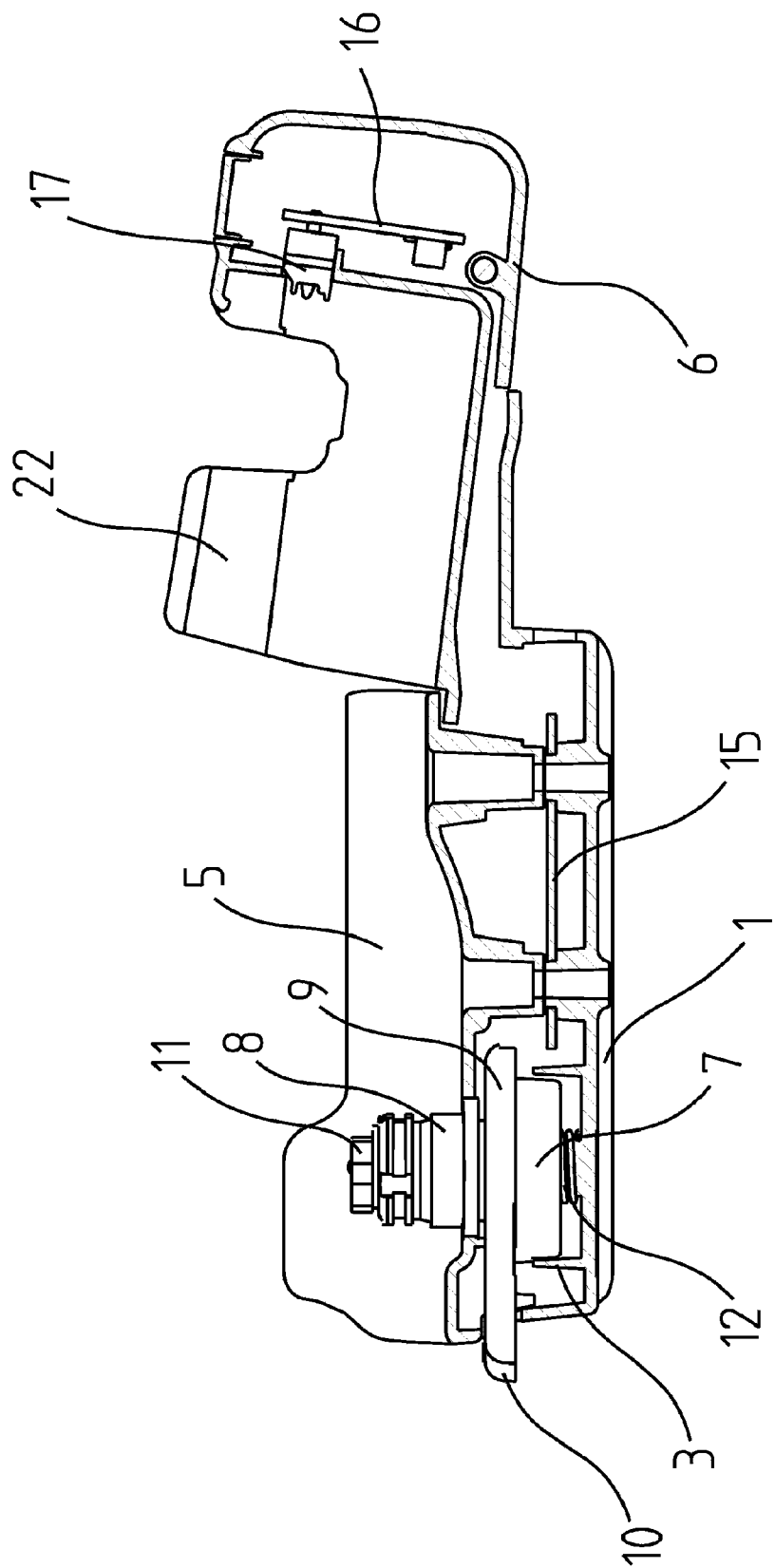
FIG. 4 depicts a longitudinal section of the holder according to a representative embodiment of the invention.
Figure 5:
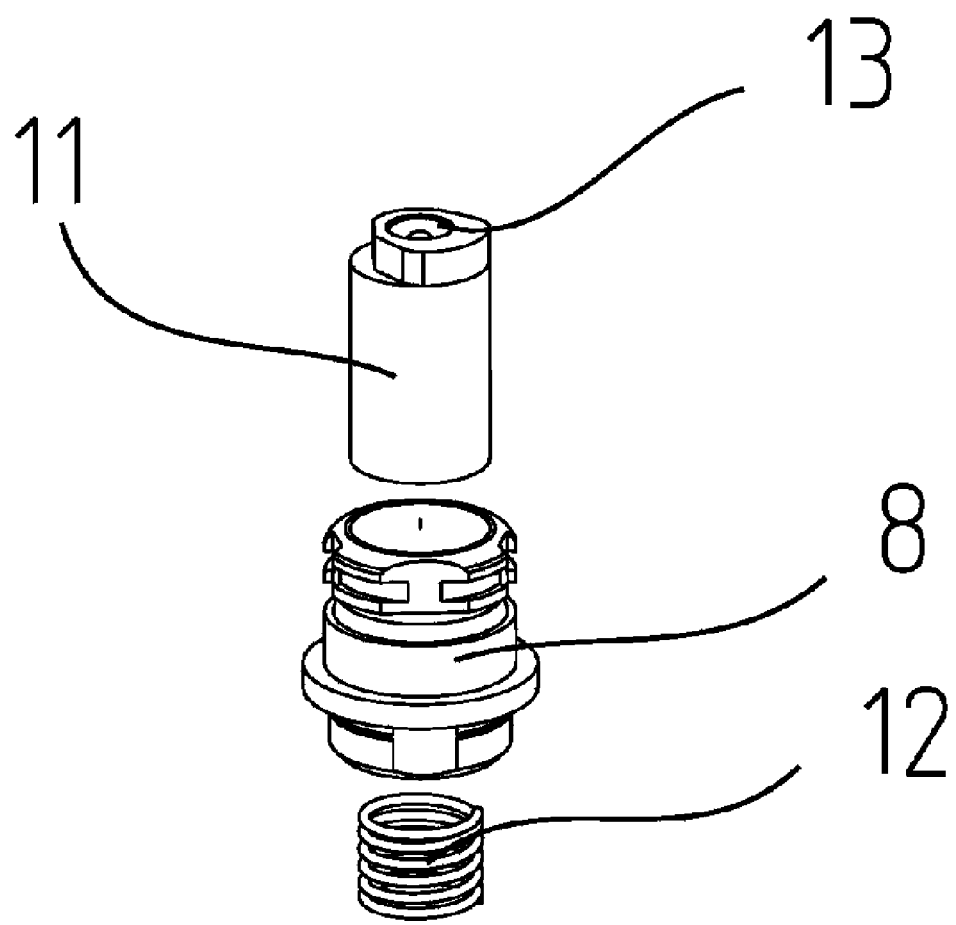
FIG. 5 shows an exploded view of the locking module of the holder according to a representative embodiment of the invention.
Figure 6:
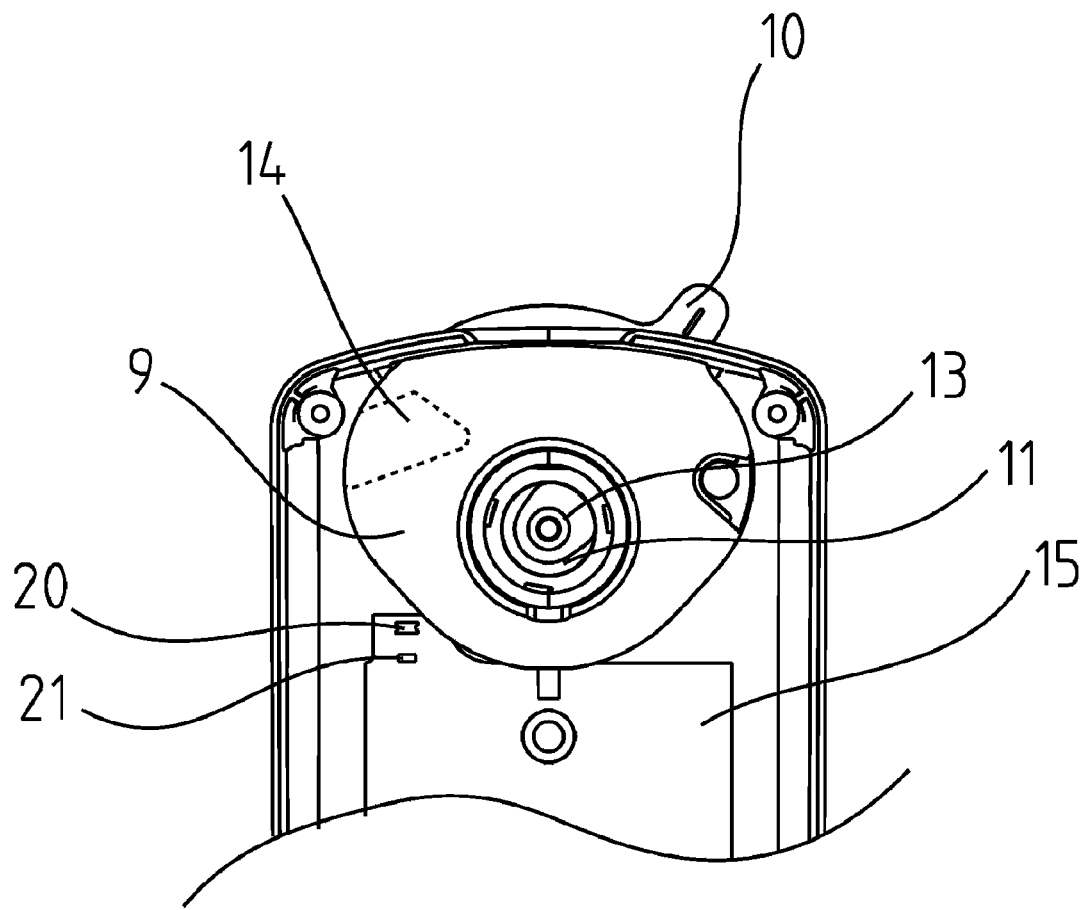
FIG. 6 shows the locking module in the initial position according to a representative embodiment of the invention.
Figure 7:
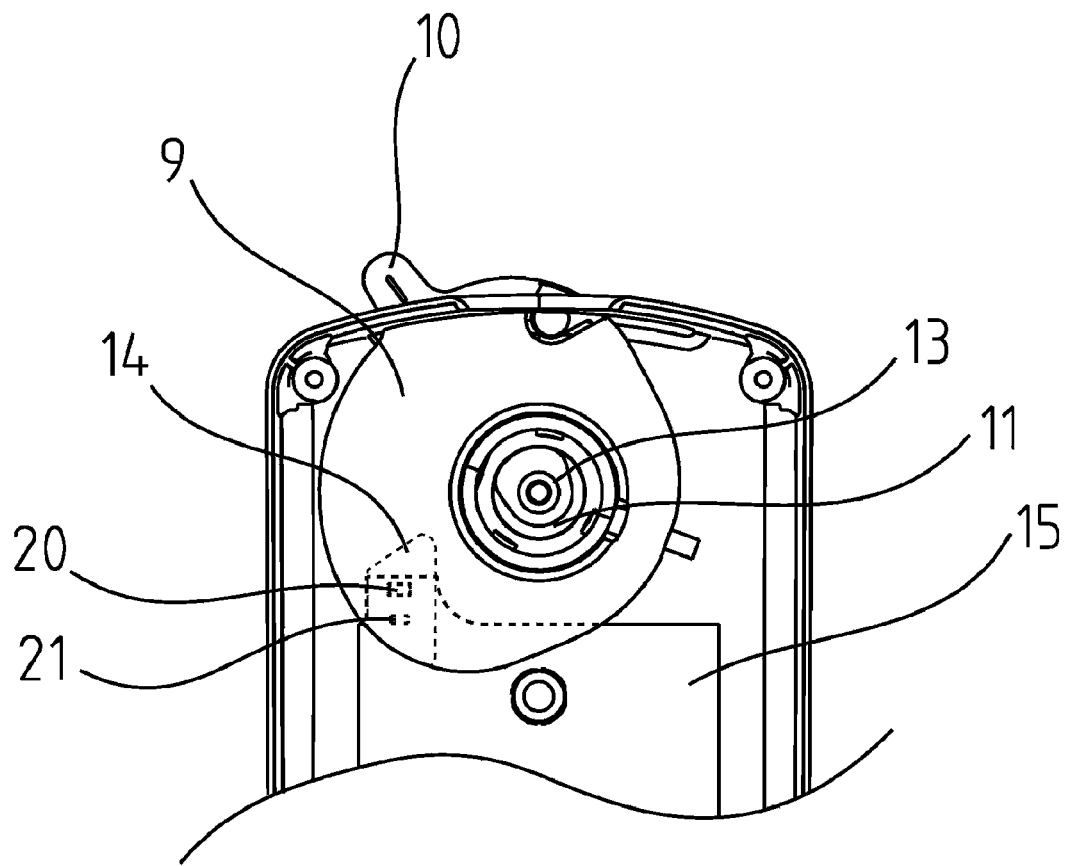
FIG. 7 shows the locking module in a "blocked" position according to a representative embodiment of the invention.

Detailed description will be given below with reference to accompanying drawings.

The satellite phone holder, particularly for mechanical vehicles, attachable to other electronic devices, particularly to a hands-free mobile phone kit, according to this invention, comprises the following basic modules: the base 1, mounted within a mechanical vehicle, for example to the dashboard of a car, the locking module 2, located rotatably in the round socket 3 of the base 1; the electronic module 4, mounted within the base 1, and the bipartite cover composed of the upper part 5 and the lower part 6.

The base 1 of the holder has the shape of a rectangular bowl with the round socket 3 in its upper part, into which the ring 7 of the locking module 2 is rotatably mounted.

The locking module 2 consists of a metal plug 8 that is a sleeve, the shape and dimensions of which fit to a jack, which engages with the satellite phone holder. The drawing presents the plug 8 adapted to the jack of the Iridium satellite phone. The plug 8 is fixed to the disc 9 provided with the lever 10, protruding from the base 1, and with the ring 7, attached to the bottom side of the plate and rotatably mounted in the socket 3 in the base 1. In the hole of the plug 8, there is a slidable cylindrical antenna core 11, pressed by the push spring 12. The shape and dimensions of the tip 13 of the core 11 are adapted to the corresponding jack of the satellite phone.

The disc 9 of the locking module has the insert 14 in its bottom part, which is capable of reflecting the light emitted by the photodiode 20 of the electronic module 4.

Figure 8:
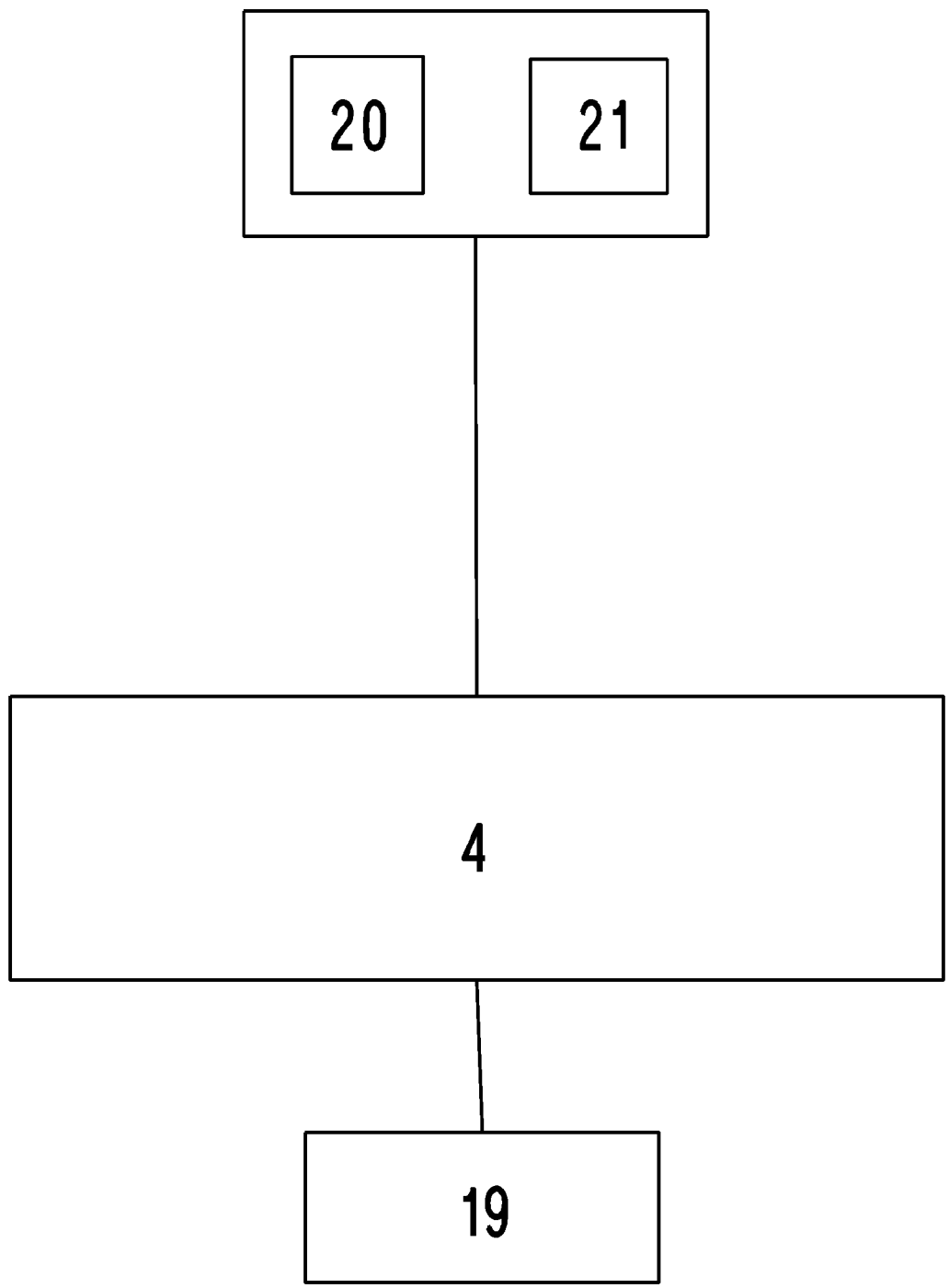
FIG. 8 depicts a block diagram of the electronic module of the holder according to a representative embodiment of the invention.

The electronic module 4 of the holder, depicted on a separate drawing (FIG. 8), is composed of two PCBs 15 and 16, out of which the latter 16 is fitted with the electric coupling 17, which engages with a connector of the satellite phone, not shown on the drawing. The PCB 16 is connected, by means of the connecting strip 18, with the PCB 15. The PCB 15 is a printed circuit board with electric slots 19 connected to the wiring system of the vehicle and is provided with the photodiode 20 and the light detector 21.

Both the upper 5 and the lower 6 part of the cover have shape and dimensions adapted to the shape and size of the satellite phone locked in the holder. Lower part 6 of the cover has the grip arms 22, which prevent the phone from slipping out from the holder. The buttons 23, which are used to switch between the satellite phone's operating modes, are connected to the electric coupling 17, which is located within the lower part 6 of the cover.

The lower part 6 of the cover is connected to the base 1 with hinges (not visible on the drawing), which enable tilting it away from the base 1. It also has push springs (not depicted on the drawing), which hold it in this tilted position. The upper part 5 of the cover has a hole 24, through which the plug 8 with the antenna core 11, passes through.

The satellite phone holder, particularly for mechanical vehicles, attachable to other electronic devices, particularly to a hands-free mobile phone kit, operates in the following manner:

In the initial position, the lever 10 of the locking module 2 is in the rightmost position, while the lower part 2 of the cover is tilted in the upfront direction, which allows inserting the satellite phone into the space between the grip arms 22.

When the phone sits in the holder, its upper part is pressed to allow the plug 8 to go into the phone's antenna jack. Next, the lever 10 of the locking module is rotated leftwards, which results in that the plug 8 locks, in the known way, in the antenna jack of the satellite phone. Concurrently, the rotation of the disc 9 of the locking unit 2 results in that the insert 14, attached to the bottom of the disc, moves to a position directly above the photodiode 20 and the detector 21. This causes the light beam emitted by the photodiode 20 to be reflected by the insert 14 and to fall on the detector 21, thus activating the electronic system of the holder, which turns on or switches between the operating modes of the phone, e.g., connects it to a hands-free mobile phone kit.

Because of this solution, it is possible, by single-handedly pressing the phone tight to the holder and rotating the lever 10, to lock the satellite phone in the holder, to concurrently activate the electronic module and to switch the phone into a desired operating mode, which allows convenient connection with other electronic devices, particularly, with a hands-free mobile phone kit.

Similarly, a single-handed action towards the opposite direction results in switching the phone's operating mode, turning off the electronic module and concurrent unlocking the phone to remove it from the holder.

This invention is not only limited to the design exemplified on the drawing, but it also includes any changes in design, in particular, consisting in either an adaptation of the elements of the holder to the dimensions and shape of a satellite phone to be locked in the holder, or enabling the connection of a satellite phone to various electronic devices connected to the holder.

The invention claimed is:

1. A satellite phone holder for holding a satellite phone equipped with an antenna jack and an electric connector for transmitting signals to an external electronic device, the holder adapted to attach to the electronic device, and the holder comprising:

a base (1);

an electronic module (4) for connecting electrically to the electric connector of the satellite phone, said electronic module (4) comprising a photodiode (20) and a detector (21), and adapted for receiving, processing, and distributing signals received from the satellite phone to the external electronic device;

a cover (5) for said electronic module with a cavity, said cavity having a shape and dimensions that fit to a shape and dimensions of the satellite phone; and a locking module (2) comprising a disc (9) with a lever (10); said disc (9) having a bottom surface, and said disc (9) being located, by means of a ring (7), in a rotatable socket (3) in said base (1) and being provided with a rotatable plug (8) into which an antenna core (11) is inserted;

wherein said rotatable plug (8) has a size and a shape adapted to the antenna jack of the satellite phone; and an insert (14) is disposed on said bottom surface of said disc (9); and when the locking module (2) is in a blocked position, said insert (14) reflects light from said photodiode (20) to said detector (21) whereby allowing for switching between the mobile phone's operating modes.

2. The holder of claim 1, wherein the external electronic device is a hands-free mobile phone kit.

3. The holder of claim 1, wherein said electronic module (4) is equipped with a first PCB (15), said first PCB (15) being fixed to said base (1) and, by means of a connecting strip (18), is connected to a second PCB (16), said second PCB (16) being provided with an electric coupling (17), said coupling (17) engaging with the electric connector of the satellite phone.

4. The holder of claim 3, comprising further a switch and buttons (23), wherein said PCB (16) forms an electric connection to said switch activated by said buttons (23) for changing between operating modes of the phone as set by said locking module (2).

5. The holder of claim 1, wherein said rotatable plug (8) has a form of a metal tube; a slidable metal antenna core (11) is disposed in said metal tube, and said slidable metal antenna core (11) is biased by a push spring (12).

6. The holder of claim 1, wherein said base (1) has a cover comprising an upper part (5) and a lower part (6) with grip arms (22), and said lower part is fixed to said base (1) with a hinge and tilted to its initial position by a push spring.

7. A holder of claim 6, wherein a hole (24) is disposed in said upper part (5), and said plug (8) with the antenna core (11) passes through said hole (24).

* * * * *